(12) United States Patent
Beall et al.

(10) Patent No.: US 6,299,678 B1
(45) Date of Patent: Oct. 9, 2001

(54) BINDER SYSTEM FOR HONEYCOMB CERAMIC BODIES AND A METHOD FOR PRODUCING SAID HONEYCOMB BODIES

(75) Inventors: Douglas M. Beall, Painted Post, NY (US); Devi Chalasani, San Jose, CA (US)

(73) Assignee: Corning Incorporated, Corning, NY (US)

( * ) Notice: Subject to any disclaimer, the term of this patent is extended or adjusted under 35 U.S.C. 154(b) by 35 days.

(21) Appl. No.: 09/735,775

(22) Filed: Dec. 13, 2000

Related U.S. Application Data

(60) Provisional application No. 60/174,111, filed on Dec. 31, 1999.

(51) Int. Cl.[7] ............................ C04B 35/63; C04B 35/14; C08L 1/26; C08L 1/28; C08L 101/12
(52) U.S. Cl. .................. 106/285; 106/181.1; 106/190.1; 106/196.1; 106/311; 501/109; 501/119; 501/94; 264/630; 264/631; 264/669; 419/65
(58) Field of Search ............................ 106/181.1, 190.1, 106/196.1, 285, 311; 501/109, 119, 94; 264/630, 631, 669; 419/65

(56) References Cited

U.S. PATENT DOCUMENTS

| | | |
|---|---|---|
| 4,680,154 | 7/1987 | Matsubara et al. . |
| 5,019,537 | 5/1991 | Kato et al. . |
| 5,344,799 | 9/1994 | Wu . |
| 5,538,681 | 7/1996 | Wu . |
| 5,678,165 | 10/1997 | Wu . |
| 6,080,345 | * 6/2000 | Chalasani et al. ............... 264/109 |
| 6,132,671 | * 10/2000 | Beall et al. ...................... 264/630 |

FOREIGN PATENT DOCUMENTS

| | | |
|---|---|---|
| 0 650 944 | 5/1995 | (EP) . |
| 0 714 867 | 6/1996 | (EP) . |
| 4-341787 | 11/1992 | (JP) . |
| 99/07652 | 2/1999 | (WO) . |
| 99/10294 | 3/1999 | (WO) . |

\* cited by examiner

*Primary Examiner*—David Brunsman

(57) ABSTRACT

A binder system for use in the formation of ceramic or other powder-formed greenware comprising a binder, a solvent for the binder, a surfactant, and a component that is non-solvent with respect to the binder and solvent. The non-solvent component exhibits a lower viscosity than the solvent when containing the binder and comprises at least a portion of a branched chain paraffin exhibiting a 90% recovered distillation temperature ranging between 205° C. to about 225° C. and a carbon chain length comprised predominantly of carbon chain distributions ranging from 12 to 14. Also disclosed is a process of forming and shaping plasticized powder mixtures and a process for forming ceramic articles utilizing the binder system.

26 Claims, 2 Drawing Sheets

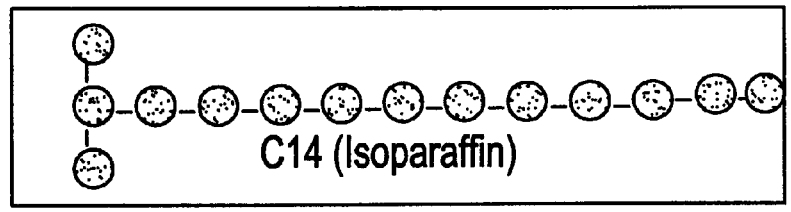
FIG. 1D  C14 (Isoparaffin)
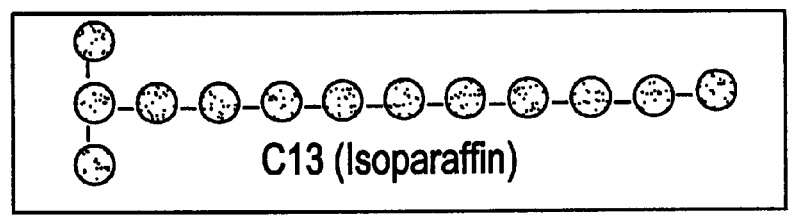
FIG. 1C  C13 (Isoparaffin)
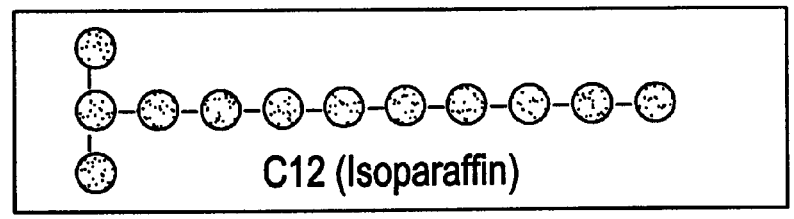
FIG. 1B  C12 (Isoparaffin)
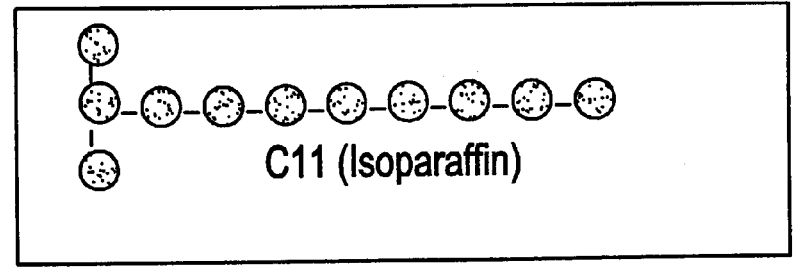
FIG. 1A  C11 (Isoparaffin)

BINDER SYSTEM FOR HONEYCOMB CERAMIC BODIES AND A METHOD FOR PRODUCING SAID HONEYCOMB BODIES

This application claims the benefit of U.S. Provisional Application No. 60/174,111, filed Dec. 31, 1999, entitled "Improved Binder System for Honeycomb Ceramic Bodies and a Method for Producing Said Honeycomb Bodies", by Beall et al.

BACKGROUND OF THE INVENTION

1. Field of the Invention

The present invention generally relates to a binder system for use in the field of forming ceramics or ceramic bodies and a method of producing ceramics or ceramic honeycomb bodies utilizing such a binder system. More particularly, the invention is concerned with a binder system that contains a branched paraffin-based organic liquid component and the use of that branched paraffin-containing binder system in a method for producing ceramic honeycomb bodies

2. Discussion of the Related Art

Binders and binder systems useful for the manufacture of products from powdered materials, e.g., from particulate ceramic materials, must meet a number of requirements. For example, the binder and binder systems must be compatible with the ceramic material such that a flowable dispersion comprising a relatively high loading of the ceramic material in the binder may be provided. In addition, the "green" preform produced by shaping the dispersion of ceramic powder in the binder should have reasonable strength such that it can be handled.

For desirable "burnout" or removal of the binder, the binder should be removable from the shaped ceramic part without incurring distortion or breakage of the part. Furthermore, the binder-free preform should have at least a minimum level of strength, yet be sufficiently free of binder residues that defect-free consolidation is readily achievable.

The formulation of binders meeting these requirements is complex and a large number of different binder formulations have been disclosed in the prior art. Recently, cellulose ether binders have been favored for use in the forming articles of various shapes; i.e., honeycomb substrates. The mixtures are intimately blended and homogeneous and result in the green body having good integrity in size and shape, as well as uniform physical properties. In addition to the binders, these powder mixtures typically include certain organic additives, including for instance, surfactants, lubricants, and dispersants that function as processing aids to enhance wetting thereby producing a uniform batch.

Recently, there has been an increase in the demand for thinner walled, higher cell density cellular structures, complex shaped product, and products having a large frontal area. Thin walled and complex shaped products produced, utilizing the current binder technology, i.e., cellulose ether binders, are extremely difficult to handle without causing shape distortion because of the low strength of the "green" preform.

One proposed solution disclosed in co-assigned U.S. Pat. App., Ser. No. 60/069,637 (Chalasani et al.) involves the use of a powder mixture, for forming honeycomb structures, that includes powder materials, binder, solvent for the binder, surfactant, and a non-solvent (with respect to the binder, solvent and powder materials), preferably a hydrophobic non-solvent. This powder mixture is mixed, plasticized and shaped to form a green ceramic preform body having improved wet green strength and thus is especially suitable for use in the processing of thin walled honeycomb structures.

While this Chalasani reference provides significant advances in the capability of the art to form complex, thin-walled ceramic honeycomb bodies through extrusion, including increased extrudate stiffness for equivalent extrusion pressures over those ceramic batches extruded without oil and an increased extrusion rate (2–3X), the inclusion of this non-solvent in the powder, e.g., light mineral oil, results in additional complications in the "burnout" or removal of the binder. Specifically, it is difficult to remove the binder components from the shaped ceramic part without incurring distortion or breakage of the part. Specifically, the strength of the material in the binder removal region (150 to 500° C.) is considerably weaker compared to the standard non-oil batches. Furthermore, the corresponding dimensional changes in this region are also significantly larger due to the complex process of oil and binder removal. As a result, cracking becomes an important issue, especially when volume of the parts is large. As such, special considerations in the firing of the ceramic honeycomb must be undertaken to avoid cracking of the ceramic body; e.g., specially designed kilns, apparatus for volatile removal, reduced oxygen containing atmospheres and increased, complicated firing cycles.

An improved binder system for use in the formation of ceramic or other powder-formed greenware that overcomes the aforementioned firing problems is disclosed in assigned U.S. Pat. App. Ser. No. 09/321,013 (Beall et al.). The binder system disclosed therein comprises a binder, a solvent for the binder, a surfactant, and a component that is non-solvent with respect to the binder and solvent. The non-solvent component exhibits a lower viscosity than the solvent when containing the binder and comprises at least a portion of an organic liquid having a 90% recovered distillation temperature of no greater than about 225° C. and more preferably less than 220° C.; e.g., odorless mineral spirits. The benefit of using these organic liquids, including odorless mineral spirits, is that allows for its removal during the drying portion of the heating through evaporation. As such, at least a portion of the binder system is removed prior to the firing portion of the heating without any exothermic intensity associated with previous binder systems.

Recently it has been discovered that certain straight chain hydrocarbons and those branched chain hydrocarbon having predominately carbon chain distributions of less than 12 or and a 90% recovered distillation below about 205° C.; (e.g. certain odorless mineral spirits) resulted in uneven flow fronts during extrusion in a twin screw mixer, and ultimately, resulted in regions where the extrudate exhibited buckled webs. As these regions typically result in reduced strength in the fired product and increased backpressure when the fired product is used in standard automotive exhaust applications, they are therefore undesirable. It was discovered that the use of these materials reduced the torque experienced by the extruder during mixing. This is thought to reduce the degree of mixing which results in inhomogeneity in the batch. These areas of inhomogeneity are thought to contribute to the uneven flow.

In light of the foregoing inconveniences experienced in the art, there remains a need to develop a binder system which permits a ceramic body to be formed and fired into a desired ceramic article without the presence of buckled webs and subsequent increase in back pressure upon use of the ceramic article in automotive exhaust.

SUMMARY OF THE INVENTION

The present invention relates to a method of producing a ceramic honeycomb body using a low molecular weight branched chain iso-paraffin in the organic binder system. Surprisingly it has been discovered that branched paraffins give higher torques during mixing and result in more vigorous mixing and, turn, a more homogenous batch. As a result, the aforementioned uneven flow regions are eliminated, and thus the avoidance of buckled web defects in the fired ceramic that typically accompany this uneven flow phenomenon. As with the other low molecular weight fluids, the branched paraffin results in a high wet strength of the extruded product and evaporates during the drying process, eliminating exotherms that can result in cracking during firing. Simply stated, it has been discovered that the use of a branched paraffin hydrocarbons-containing binder systems has significant advantage over the use of a prior art hydrocarbon-containing binder systems in the forming process.

The present invention provides for a binder system for use in the formation of ceramic or other powder-formed greenware. The essential components of the binder system of the invention include a binder, a solvent for the binder, a surfactant, and a component that is non-solvent with respect to any inorganic components, binder and solvent. The non-solvent component exhibits a lower viscosity than the solvent when containing the binder and comprises at least a portion of a branched chain paraffin having a 90% recovered distillation temperature between about 205° C. and no greater than about 225° C., as measured by, and defined in ASTM D86. Furthermore, the branched chain paraffin exhibits a carbon chain length comprised predominantly of carbon chain distributions ranging from 12 to 14.

An advantageous feature of the binder system is that it is useful for producing cordierite honeycomb structures having thin walls and a large number of cells. Specifically, the resulting so-formed green body exhibits a high degree of stiffness necessary to avoid slump in ceramic honeycomb structures with very thin walls (a thickness less than 150 $\mu$m), and furthermore the presence of buckled web defects are avoided. As with previous binder systems incorporating a non-solvent organic liquid component, firing cracks are avoided, as the branched chain paraffin is capable of removal during the drying portion of the heating through evaporation without developing the exothermic intensities associated with previous binder systems.

BRIEF DESCRIPTION OF THE FIGURES

For a better understanding of the invention, reference is made to the attached drawings, wherein:

FIG. 1A–1D are a schematic illustrations of the branched chemical structure of certain branched chain paraffin distributions that form the branched paraffins suitable for use in the instant invention;

DETAILED DESCRIPTION OF THE INVENTION

Figure 2:
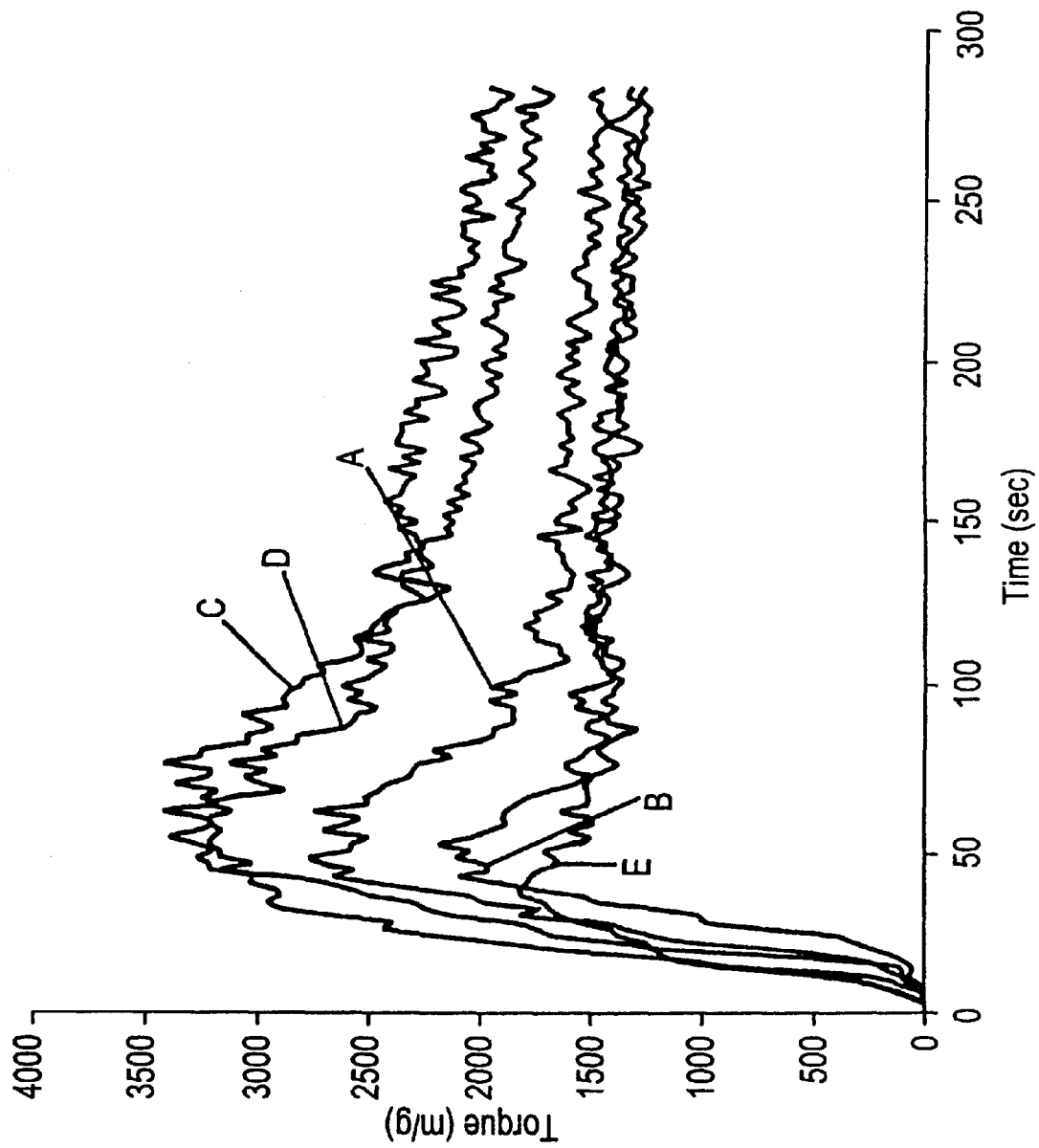
FIG. 2 is a graphical illustration comparing the resultant torque curves associated with ceramic batches incorporating binder systems incorporating various non-solvent components, including the inventive branched paraffins.

The present invention discloses a novel binder system for producing cordierite honeycomb structures having thin walls and a large number of cells. According to the invention a binder system for use in the greenware processing steps of a subsequently fired ceramic or other inorganic body includes the following components, a binder, a solvent for the binder, a surfactant, and a component which is a non-solvent with respect to at least the binder, inorganic and solvent components; i.e., immiscible with the binder and the solvent. The non-solvent exhibits a lower viscosity than the solvent when containing the binder and at least a portion of the non-solvent comprises a branched chain paraffin. This branched chain paraffin possesses a 90% recovered distillation temperature ranging between 205° C. to about 225° C. as defined by, and measured according to ASTM D86, and more preferably between 205° C. and 220° C. It is contemplated that the invention described herein includes those binder systems in which the entire non-solvent is comprised of a branched paraffin. Branched paraffin as used herein refers to a paraffin that is branched in one of two ways, either secondary (iso) or tertiary, with isoparaffins being preferred form of branched paraffins for use in the instant invention.

The functioning of the non-solvent, having at least a portion of a branched chain paraffin in the instant invention, remains the same as that as disclosed in the Beall and Chalasani applications. In short, the non-solvent comprising at least a portion of a branched chain paraffin replaces a portion of the solvent and does not contribute to plasticity, but provides the fluidity necessary for shaping while still allowing the batch to remain stiff. As such, the instant binder system achieves the same desired increase in the wet green strength over that achieved with conventional binders, without creating additional processing difficulties. In other words, the binder system of the instant invention allows for the extrusion of a stiff batch without adversely affecting performance such as the extrusion pressure, torque and flow characteristics. Specifically, the resulting wet extrudate exhibits a high degree of stiffness which is necessary to avoid slump in ceramic honeycomb structures with very thin webs (<150 $\mu$m).

The branched chain paraffin with it's 90% recovered distillation temperature point, as measured by the ASTM standard appropriate for the material being measured, ASTM D86, being between 205 and about 225° C., ensures that substantially all of the branched chain paraffin will evaporate in standard drying processes utilized to remove water, regardless of the partial pressure and the air flow conditions maintained during the drying process. The 90% recovered distillation temperature of the branched chain paraffin should, however be high enough to ensure that the paraffin is not removed in the mixing, plasticizing and shaping greenware processing steps.

Acceptable branched chain paraffins exhibit a branched carbon chain length comprised predominately (>75%) of carbon chain distributions ranging from 12 to 14. FIGS. 1A–1D are schematic illustrations of four branched chain paraffin distributions suitable for use in forming the a branched chain paraffin suitable for in the instant invention; a C11, C12, C13 and C14 branched chain paraffin distribution, respectively. It should be noted that the circles in the center of the chain represent $CH_2$ groups and the circles at the end of the chain represent $CH_3$ groups, while the junction circle represents a CH group.

An additional feature of the branched chain paraffin is that it, like the organic liquid of Beall, exhibits an endotherm over the temperature range of 100–110° C., a temperature range overlaps with the temperature range during which water is typically removed from the green body during drying. As such, the use of a binder system incorporating at least a portion of this branched chain paraffin as the non-solvent is superior to any of the conventional binder systems, in that this inventive binder system provides retains the benefit discovered in the Beall, that at least a portion of the organics in the binder system, the organic liquid can be removed by evaporation (through the drying process) prior to the actual firing process. This removal of the organic liquid portion of the organic binder will reduce the exotherm experienced by a green body during the firing and will likely lead to reduced cracking during firing of honeycomb ceramic or other inorganic substrate bodies.

While not intending to be limited by theory one of the main benefits of the use of the branched chain paraffin as the organic liquid component of the non-solvent is that higher torques are achieved during mixing, resulting in more vigorous mixing and, turn, a more homogenous batch. The ultimate effect of this higher torque/better mixing is the excellent uniformity of the extrusion flow front like that typically associated with higher molecular weight hydrocarbons such those exhibiting carbon chain distributions in the range of C20. In other words, it has been discovered that the use of the branched paraffins in the binder system resulted in a more consistent rheology to the batch, thereby eliminating flow instability. As such the resulting extrudate is free from wiggly web defects. It is noted that although the low molecular weight of the organic fluids disclosed in the aforementioned Beall reference allowed for removal during drying by an evaporation process and the capability of removing the fluid was prior to the firing step without any exothermic intensity, a disadvantage of the use of those materials was that a flow instability was created in the extrusion of the batch through the die. This instability, in turn, created zones of fast flow and resulting extrudate contained many wiggly webs. It is theorized that the branched paraffins of the instant invention do not create the aforementioned flow instability due to the fact that the adsorption of the hydrocarbon molecule of the paraffin onto the inorganic batch mixture is decreased when compared to prior art unsaturated hydrocarbon. Furthermore, it is thought that the shear characteristics of the inventive paraffin based binder systems are more suited to the types of mixing processes utilized to form cordierite materials.

The preferred binders used in this invention are aqueous based, that is, capable of hydrogen bonding with polar solvents. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M cellulose products from Dow Chemical Co. Methocel A4M cellulose is a methylcellulose. Methocel F4M, F240, and K75M cellulose products are hydroxypropyl methylcellulose.

The preferred cellulose ether binders can be combined with an aqueous co-binder component, including for example, PVOH or polyethylene oxide.

Acceptable solvents for use in the inventive binder system should be aqueous-based and provide hydration of the binder component and the inorganic particulate component. Particularly preferred, as the solvent, is water or water-miscible solvents.

Specific examples of acceptable non-solvents, that can be used in combination with the branched chain paraffins include, for example, light mineral oil, corn oil, high molecular weight polybutenes, polyol esters, a blend of light mineral oil and wax emulsion, a blend of paraffin wax in corn oil, and combinations of these. Particularly preferred "non-organic liquid" non-solvents include polyalphya olefins, C14–C24 light mineral oils and alpha olefins.

Acceptable surfactants for use in the inventive binder system include, for example, C8–C22 fatty acids and/or their derivatives, C8–C22 fatty esters, C8–C22 fatty alcohols, stearic, lauric, linoleic, palmitoleic acids, stearic acid in combination with ammonium lauryl sulfate, with stearic lauric and oleic being particularly preferred.

In a preferred embodiment, the binder system of the instant invention comprises, assuming 100 parts binder, about 15 to 30 parts non-solvent with the branched chain paraffin component comprising at least 1 part of the non-solvent, about 0.5 to 10 parts surfactant, about 2 to 20 parts binder, and about 50 to 75 parts solvent. In a more preferred embodiment, the binder system comprises about 5 to 10 parts non-solvent with the organic liquid component comprising at least 1 part of the non-solvent, about 1 to 5 parts surfactant, about 5 to 15 parts binder, and about 60 to 70 parts solvent.

A particularly preferred binder system embodiment comprises a binder component comprising a cellulose ether selected from the group consisting of methylcellulose, methylcellulose derivatives, and combinations thereof, a branched chain paraffin in combination with a non-solvent component comprising a polyalpha olefin, and a surfactant is selected from the group consisting of stearic acid, ammonium lauryl sulfate, lauric acid, oleic acid, palmitic acid and combinations thereof and a solvent comprising water.

Although the binder system offers substantial advantages in conventional inorganic forming processes it provides unique processing advantages for ceramic materials, especially those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

A particularly preferred ceramic material and one which ultimately forms cordierite upon firing is as follows, in parts by weight, assuming 100 parts inorganics: about 33 to about 41, and most preferably about 34 to about 40 parts of aluminum oxide, about 46 to about 53 and most preferably about 48 to about 52 parts of silica, and about 11 to about 17 and most preferably about 12 to about 16 parts magnesium oxide.

In the practice of the present invention, a moldable powder batch composition comprising a binder system and an inorganic powder component consisting of a sinterable inorganic particulate material, e.g., a ceramic powder material, can be prepared by using the components in any desired amounts selected.

In a preferred embodiment, the composition comprises 100 parts by weight of the inorganic powder, about 2 to 50 parts by weight of the non-solvent component with the branched chain paraffin component comprising at least 1 part by weight, about 0.2 to 10 parts by weight of the surfactant component, about 2 to 10 parts by weight of the binder component, and about 6 to 50 parts by weight of the solvent component.

In a particularly preferred embodiment, the composition comprises 100 parts by weight of the inorganic powder, about 5 to 10 parts by weight of the non-solvent, about 0.2 to 2 parts by weight of the surfactant component, about 2.5 to 5 parts by weight of the binder component, and about 8 to 25 parts by weight of the solvent component.

The individual components of the binder system are mixed with a mass of the inorganic powder material, e.g., the ceramic powder material, in a suitable known manner, to prepare an intimate and uniform mixture of the ceramic material and the binder system. Uniform mixing of the binder system and the ceramic powder material may be accomplished in a known kneading process.

In a preferred embodiment, the plasticization takes place in the second stage. In this stage the wet mix from the first stage is sheared in any suitable mixer in which the batch will be plasticized, such as for example in a twin-screw extruder/mixer, auger mixer, muller mixer, or double arm mixer, etc.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The prepared ceramic green body is then fired at a selected temperature under suitable atmosphere and for a time dependent upon the composition, size and geometry so as to result in a fired body of the desired ceramic. For example, for a composition which is primarily for forming cordierite, the temperatures typically range from about 1300 to about 1450° C. with the holding times at these temperatures ranging from about 1 hour to 8 hours. Firing times and temperatures depend upon factors such as kinds and amounts of materials and the type of equipment utilized but typical total firing times range between about 20 to 80 hours.

The inventive batches incorporating the branched chain paraffin, retain many of the advantages of standard binder systems incorporating a non-solvent component have over conventional systems, including: (1) significantly lower extrusion temperatures; (2) lower temperature processing and mixing torques, and thereby higher extrusion feed rates, while still maintaining product quality; (3) smooth skin; and, (4) good shape retention, which in the case of multicellular structures, results in an improvement of the cell orthogonality at the perimeter of the part closer to the skin.

In addition to the increased wet strength and increased extrusion speeds, the use of the branched chain paraffins, additionally retains many of the benefits associated with the use of organic liquid containing binder systems. The large exotherms associated with burnout of oil based non-solvents and other conventional binder systems that typically resulted in differential shrinkage and cracking are not present; the low 90% recovered distillation temperature, between about 205 and no greater than about 225 and, preferably between 205 and less than 220° C., exhibited by the branched chain paraffins is responsible for this retained benefit. In short, the benefits previously disclosed for the organic liquid based binder systems and retained by the use of a branched chain paraffin include the following: (1) the removal of at least a portion of the binder system, the branched chain paraffin, during drying, and the subsequent reduction in the amount of fluid/binder that needs to be removed during firing, thereby reducing the occurrence of cracking or defects during firing; (2) dimensional changes exhibited during firing resembling that of a green bodies with no oil-based fluid; and (3) easy removal at a comparatively higher rates thus an increased productivity of fired bodies.

The instant invention is thus suitably applied to the fabrication of complicated formed bodies, especially ceramic, that are usually formed by extrusion, and to the manufacture of the corresponding fired bodies such as multicellular ceramic honeycomb structures having a high cell density and exhibiting thin cell wall dimensions.

EXAMPLES

To further illustrate the principles of the invention of the present invention, there will be described several examples of the binder system according to the invention. However, it is to be understood that the examples are given for illustrative purpose only, and the invention is not limited thereto, but various modifications and changes may be made in the invention, without departing from the spirit of the invention.

Examples 1–5

Five separate plasticized batch mixtures each comprising the inorganic mixture of TABLE I were each mixed each with a different one of the five organic batch systems listed in TABLE II. TABLE III lists the carbon chain distribution and the 90% recovered distillation temperature for each of the materials used as the non-solvent Inventive Composition 1 and Comparison Compositions 2 and 3, incorporated a branched chain paraffin, (Soltrol 170, 130 and 220, respectively). Comparison Composition 4 incorporates a non-solvent mixture of a polyalphyl olefin (DURASYN 162, Amoco Chemicals) having a chain length of C20 and C30, while Comparison Composition 5 incorporates a inventive binder system including a non-solvent comprising an (Gulftene 12). Both the Durasyn-162 and Gulftene-12 are straight chain hydrocarbon fluids.

The batches were mixed and plasticized utilizing a Brabender mixer. The mixing torque of each of the compositions was measured while the mixtures were plasticized and mixed in the Brabender mixer, with the mixing torques reported in the plots of FIG. 2; specifically torque is plotted as a function of mixing time. Plots A–E correspond to the Soltrol 170, 130, 220, Durasyn and Gulftene 12 composition plots, respectively.

An examination of the Figure reveals that the torque-time profile of the Durasyn-162-containing batch, Plot designated D, is representative of a profile generally resulting in a good extruding batch. Specifically, it shows a region of increasing torque, ending in a peak, before falling to a steady state value. It is noted that the steady state or end torque usually correlates to the torque exhibited by the batch when extruded through a typical twin screw extrusion or single screw extrusion process, while the peak torque is indicative of the ease of wetting of the powders or the initial torque during mixing.

The torque-time profile of the Comparison Compositions 2 and 3, plot designations B and C, and the Gulftene-12-containing batch, Plot designation E, are quite different from the standard; these torque-time profiles are quite similar to that profile exhibited by odorless mineral spirits. Specifically, the peak torques are quite low, and the steady state torques are not much lower than the peak; i.e., a low peak-steady state ratio. It is this type of rheology that typically results in unstable flow in twin-screw extruders and subsequently extrudate exhibiting many buckled web defects.

The inventive composition containing an amount of the appropriate branched chain paraffin, Plots A, exhibited a torque-time profile comparable to that exhibited by the Durasyn containing composition of Plot D. Specifically, the peak torque is much higher, as is the peak-to-end torque ratio. This rheology was able to deliver defect-free ware, which retains all of the advantages of the non-solvent, most importantly the ability to be evaporated in a typical dryer.

TABLE I

| INORGANIC COMPONENT | PARTS BY WEIGHT |
|---|---|
| TALC | 40.79 |
| CLAY | 41.82 |
| ALUMINA YIELDING PRECURSOR | 15.40 |
| SILICA YIELDING PRECURSOR | 2.00 |

TABLE II

|  | F240 METHOCEL | STEARIC ACID | NON-SOLVENT TYPE | NON-SOLVENT AMOUNT | WATER |
|---|---|---|---|---|---|
| INVENTIVE COMP. 1 | 2.70 | 0.6 | SOLTROL 170 | 6.0 | 23.65 |
| COMPARISON COMP. 2 | 2.70 | 0.6 | SOLTROL 130 | 6.0 | 24 |
| COMPARISON COMP. 3 | 2.70 | 0.6 | SOLTROL 220 | 6.0 | 23.75 |
| COMPARISON COMP. 4 | 2.70 | 0.6 | DURASYN 162 | 6.0 | 24 |
| COMPARISON COMP. 5 | 2.70 | 0.6 | GULFTENE 12 | 6.0 | 24.4 |

TABLE III

| OIL TYPE | CARBON CHAIN DISTRIBUTION | 90%/95% RECOVERED DISTILLATION TEMPERATURE (° C.) |
|---|---|---|
| SOLTROL |  |  |
| SOLTROL |  |  |
| SOLTROL |  |  |
| DURASYN 162 | 90% C20, 10% C30 | 230 |
| GULFTENE 12 | C12 | 215.4 |

We claim:

1. A binder system for use in the greenware processing steps of a subsequently fired ceramic body comprising:
a binder, a solvent for the binder, a surfactant, and a component which is non-solvent with respect to at least the binder and solvent and which exhibits a lower viscosity than the solvent when containing the binder, at least a portion of the non-solvent component comprising a branched chain paraffin exhibiting a carbon chain length comprised predominately of carbon chain distributions ranging from 12 to 14 and a 90% recovered distillation temperature between about 205 to about 225° C.

2. The method of claim 1 wherein the branched paraffin exhibits a 90% recovered distillation temperature of between about 205 to less than 220° C.

3. The binder system of claim 1 comprising in parts by weight, assuming 100 parts inorganics, about 15 to 30 parts non-solvent with the branched chain paraffin comprising at least 1 part of the non-solvent, about 0.5 to 10 parts surfactant, about 2 to 20 parts binder, and about 50 to 75 parts solvent.

4. The binder system of claim 1 comprising, in parts by weight, about 5 to 10 parts non-solvent with the branched chain paraffin comprising at least 1 part of the non-solvent, about 1 to 5 parts surfactant, about 5 to 15 parts binder, and about 60 to 70 parts solvent.

5. The binder system of claim 1 wherein the non solvent comprises, in addition to the branched chain paraffin, components selected from the group consisting of polyalpha olefins, C14–C24 light mineral oils, and alpha olefins and combinations thereof.

6. The binder system of claim 1 wherein the binder comprises a cellulose ether selected from the group consisting of methylcellulose, methylcellulose derivatives, and combinations thereof, the non-solvent comprises a mixture of polyalpha olefin and the branched chain paraffin, the surfactant is selected from the group consisting of, stearic acid, ammonium lauryl sulfate, lauric acid, oleic acid, palmitic acid and combinations thereof and the solvent is water.

7. A moldable powder batch comprising an inorganic powder component and a binder system, the inorganic powder component consisting of a sinterable inorganic particulate material wherein:
the binder system comprises a binder, a solvent for the binder, a surfactant, and a component which is non-solvent with respect to at least the binder and solvent and which exhibits a lower viscosity than the solvent when containing the binder, and comprises a branched chain paraffin exhibiting a carbon chain length comprised predominately of carbon chain distributions ranging from 12 to 14 and a 90% recovered distillation temperature between about 205 to about 225° C.

8. The method of claim 7 wherein the paraffin exhibits a 90% recovered distillation temperature of between about 205 to less than 220° C.

9. The moldable powder batch of claim 7 comprising 100 parts by weight of the inorganic powder, about 2 to 50 parts by weight of the non-solvent with the branched chain paraffin comprising at least 1 part by weight, about 0.2 to 10 parts by weight of the surfactant, about 2 to 10 parts by weight of the binder, and about 6 to 50 parts by weight of the solvent.

10. The moldable powder batch of claim 7 comprising 100 parts by weight of the inorganic powder, about 5 to 10 parts by weight of the non-solvent, about 0.2 to 2 parts by weight of the surfactant, about 2.5 to 5 parts by weight of the binder, and about 8 to 25 parts by weight of the solvent.

11. The moldable powder of claim 7 wherein the non-solvent comprises, in addition to the branched chain paraffin, components selected from the group consisting of polyalpha olefins, C14–C24 light mineral oils, and alpha olefins, and combinations thereof.

12. The moldable powder of claim 7 wherein the binder comprises a cellulose ether selected from the group consisting of methylcellulose, methylcellulose derivatives, and combinations thereof, the non-solvent comprises a mixture of a polyalpha olefin and the branched chain paraffin, the surfactant is selected from the group consisting of, stearic acid, ammonium lauryl sulfate, lauric acid, oleic acid, palmitic acid and combinations thereof and the solvent is water.

13. The moldable powder of claim 7 wherein the inorganic powder component comprises cordierite-forming raw materials.

14. A method for forming and shaping plasticized powder mixtures comprising compounding together an inorganic powder component consisting of a sinterable inorganic particulate material mixture, and a binder system comprising a binder, a solvent for the binder, a surfactant, and a component which is non-solvent with respect to at least the binder and solvent components and which exhibits a lower viscosity than the solvent when containing the binder, at least a portion of the non-solvent comprising a branched chain paraffin exhibiting a carbon chain length comprised of predominately carbon chain distributions ranging from 12 to 14 and a 90% recovered distillation temperature between about 205 to about 225° C.;

mixing and plasticizing the inorganic powder and the binder system components to form a plasticized mixture; and, shaping the plasticized mixture to form a green body.

15. The method of claim 14 wherein the paraffin exhibits a 90% recovered distillation temperature of between about 205 and less than 220° C.

16. The method of claim 14 wherein the mixing and plasticizing involves the dry-mixing the inorganic powder mixture, the surfactant and the binder to form a uniform dry blend mixture, adding the solvent to the resulting dry blend mixture to form an intermediate plasticized mixture and thereafter adding the non-solvent, including the branched chain paraffin to the intermediate plasticized mixture to form the plasticized mixture.

17. The method of claim 14 involving, subsequent to the shaping of the plasticized body, the heating of the green body to remove the binder system from the green body.

18. The method of claim 14 wherein the plasticized mixture comprises 100 parts by weight of the inorganic powder, about 2 to 50 parts by weight of the non-solvent with the branched chain paraffin comprising at least 1 part by weight, about 0.2 to 10 parts by weight of the surfactant, about 2 to 10 parts by weight of the binder, and about 6 to 50 parts by weight of the solvent.

19. The method of claim 14 wherein the plasticized mixture comprises 100 parts by weight of the inorganic powder, about 5 to 10 parts by weight of the non-solvent, about 0.2 to 2 parts by weight of the surfactant, about 2.5 to 5 parts by weight of the binder, and about 8 to 25 parts by weight of the solvent.

20. The method of claim 14 wherein the shaping is done by passing the mixture through a twin screw extruder and then through a die to form a green honeycomb structure.

21. A method of making ceramic articles comprising the steps of forming and shaping a composition for the manufacture of ceramics and firing the resulting formed and shaped green body wherein the composition for the manufacture of the ceramics comprises an inorganic powder component consisting of a sinterable inorganic particulate material, and a binder system comprising a binder, a solvent for the binder, a surfactant, and a component which is non-solvent with respect to at least the binder and solvent components and which exhibits a lower viscosity than the solvent when containing the binder, at least a portion of the non-solvent comprising a branched chain paraffin exhibiting a carbon chain length comprised predominately of carbon chain distributions ranging from 12 to 14 and a 90% recovered distillation temperature between about 205 to about 225° C.

22. The method of claim 21 wherein the paraffin exhibits a 90% recovered distillation temperature of between about 205 and less than 220° C.

23. The method of claim 21 wherein the forming involves mixing and plasticizing involves the dry-mixing the inorganic powder mixture, the surfactant and the binder to form a uniform dry blend mixture, adding the solvent to the resulting dry blend mixture to form an intermediate plasticized mixture and thereafter adding the non-solvent, including the branched chain paraffin to the intermediate plasticized mixture to form the plasticized mixture.

24. The method of claim 21 wherein the plasticized mixture comprises 100 parts by weight of the inorganic powder, about 2 to 50 parts by weight of the non-solvent with the branched chain paraffin comprising at least 1 part by weight, about 0.2 to 10 parts by weight of the surfactant, about 2 to 10 parts by weight of the binder, and about 6 to 50 parts by weight of the solvent.

25. The method of claim 21 wherein the plasticized mixture comprises 100 parts by weight of the inorganic powder, about 5 to 10 parts by weight of the non-solvent, about 0.2 to 2 parts by weight of the surfactant, about 2.5 to 5 parts by weight of the binder, and about 8 to 25 parts by weight of the solvent.

26. The method of claim 21 wherein the shaping is done by passing the mixture through a twin screw extruder and then through a die to form a green honeycomb structure.

* * * * *